US012071238B2

(12) United States Patent
Mucci

(10) Patent No.: US 12,071,238 B2
(45) Date of Patent: Aug. 27, 2024

(54) FIXED DRONE VISUALIZATION IN SECURITY SYSTEMS

(71) Applicant: Johnson Controls Tyco IP Holdings LLP, Milwaukee, WI (US)

(72) Inventor: Anthony Mucci, Wellington, FL (US)

(73) Assignee: TYCO FIRE & SECURITY GMBH, Neuhausen am Rheinfall (CH)

( * ) Notice: Subject to any disclaimer, the term of this patent is extended or adjusted under 35 U.S.C. 154(b) by 0 days.

(21) Appl. No.: 18/228,140

(22) Filed: Jul. 31, 2023

(65) Prior Publication Data

US 2023/0406497 A1    Dec. 21, 2023

Related U.S. Application Data

(63) Continuation of application No. 17/880,948, filed on Aug. 4, 2022, now Pat. No. 11,753,162, which is a continuation of application No. 16/274,066, filed on Feb. 12, 2019, now Pat. No. 11,414,188, which is a
(Continued)

(51) Int. Cl.
| | |
|---|---|
| *G05D 1/00* | (2024.01) |
| *B64C 39/02* | (2023.01) |
| *B64U 101/30* | (2023.01) |
| *B64U 101/31* | (2023.01) |
| *G05D 1/686* | (2024.01) |
| *G05D 1/689* | (2024.01) |
| *G06Q 50/26* | (2024.01) |
| *G08B 25/00* | (2006.01) |
| *G08B 25/08* | (2006.01) |
| *G08B 29/18* | (2006.01) |
| *G08B 13/196* | (2006.01) |

(52) U.S. Cl.
CPC ......... *B64C 39/024* (2013.01); *G05D 1/0094* (2013.01); *G05D 1/686* (2024.01); *G05D 1/689* (2024.01); *G06Q 50/26* (2013.01); *G08B 25/001* (2013.01); *G08B 25/08* (2013.01); *G08B 29/185* (2013.01); *B64U 2101/30* (2023.01); *B64U 2101/31* (2023.01); *B64U 2201/10* (2023.01); *G06T 2207/30232* (2013.01); *G08B 13/19695* (2013.01)

(58) Field of Classification Search
None
See application file for complete search history.

(56) References Cited

U.S. PATENT DOCUMENTS

| | | |
|---|---|---|
| 5,083,106 A | 1/1992 | Kostusiak et al. |
| 6,192,314 B1 | 2/2001 | Khavakh et al. |
| 6,317,690 B1 | 11/2001 | Gia |
| (Continued) | | |

OTHER PUBLICATIONS

International Search Report and Written Opinion on PCT/EP2015/074010, dated Feb. 3, 2016, 9 pages.

*Primary Examiner* — Todd Melton
(74) *Attorney, Agent, or Firm* — Foley & Lardner LLP

(57) ABSTRACT

An unmanned aerial vehicle is described and includes a computer carried by the unmanned aerial vehicle to control flight of the unmanned aerial vehicle and at least one sensor. The unmanned aerial vehicle is caused to fly to a specific location within a facility, where the unmanned aerial vehicle enters a hover mode, where the unmanned aerial vehicle remains in a substantially fixed location hovering over the specific location within the facility and sends raw or processing results of sensor data from the sensor to a remote server system.

20 Claims, 5 Drawing Sheets

Related U.S. Application Data continuation of application No. 14/516,671, filed on Oct. 17, 2014, now Pat. No. 10,301,018.

(56) References Cited

U.S. PATENT DOCUMENTS

| | | |
|---|---|---|
| 9,158,304 B2 | 10/2015 | Fleck |
| 9,162,753 B1 | 10/2015 | Panto et al. |
| 9,422,139 B1 | 8/2016 | Bialkowski et al. |
| 10,301,018 B2 | 5/2019 | Mucci |
| 2005/0131607 A1 | 6/2005 | Breed |
| 2006/0058928 A1 | 3/2006 | Beard et al. |
| 2008/0144884 A1 | 6/2008 | Habibi |
| 2009/0138151 A1 | 5/2009 | Smid et al. |
| 2009/0303042 A1* | 12/2009 | Song ............... G08B 25/009 340/541 |
| 2010/0100269 A1 | 4/2010 | Ekhaguere et al. |
| 2011/0046817 A1 | 2/2011 | Hamke et al. |
| 2011/0144828 A1 | 6/2011 | Chengalva |
| 2012/0235864 A1 | 9/2012 | Lu |
| 2012/0261144 A1 | 10/2012 | Vian et al. |
| 2012/0286951 A1 | 11/2012 | Hess et al. |
| 2014/0067167 A1 | 3/2014 | Levien et al. |
| 2015/0205298 A1 | 7/2015 | Stoschek et al. |
| 2015/0370251 A1 | 12/2015 | Siegel et al. |
| 2016/0042637 A1 | 2/2016 | Cahill |
| 2017/0039860 A1 | 2/2017 | Just |
| 2017/0300049 A1 | 10/2017 | Seally |

\* cited by examiner

FIXED DRONE VISUALIZATION IN SECURITY SYSTEMS

CROSS-REFERENCE TO RELATED PATENT APPLICATIONS

This application is a continuation of U.S. patent application Ser. No. 17/880,948, filed Aug. 4, 2022, which is a continuation of U.S. patent application Ser. No. 16/274,066, filed Feb. 12, 2019, which is a continuation of U.S. patent application Ser. No. 14/516,671 filed Oct. 17, 2014, the entireties of which are incorporated by reference herein.

BACKGROUND

This description relates to operation of security systems in particular surveillance systems.

Conventionally, commercial surveillance systems were those that were manned by humans that regularly traversed a facility checking in at guard stations and making observations. Surveillance systems progressed to include closed circuit television monitoring, and more recently integrated systems have been developed to include video cameras installed at strategic locations in a facility. These video cameras are in communication with a centralized remote monitoring facility and operators at the facility visually sweep the facility from the monitoring center. These tours are scripted and timed at a user request. Upon discovery of suspicious activity, the operator can engage in a custom designed response plan.

One surveillance solution has been employed by the military by the use of surveillance unmanned aerial vehicles, commonly referred to as drones. Military surveillance drones are capable of flying over substantial areas such that video surveillance can be achieved. Military surveillance drones are very expensive and address surveillance of very large outdoor areas. However, these drones are not practical for businesses that want to maintain security at a single location or small group of locations such as a warehouse or a manufacturing facility.

SUMMARY

The problem with conventional commercial types of surveillance systems is that the systems require a significant investment in video cameras to cover all critical areas and are prone to missing conditions. For example, video surveillance systems covering large areas or space require many cameras, large amount of media storage (local DVRs or remote hosting), video management tools to investigate the accumulated information from all the cameras, and analytics for each of the many streaming video channels from the many cameras. In most cases, licensing to operate the analytics is on a per channel basis. This applies to both systems that are completely wired and those that use some degree of wireless technology.

On the other hand, military surveillance drones are very expensive and address surveillance of very large outdoor areas. Commercial applications require a much more cost efficient solution. Limitations of conventional commercial systems are significant causes of missed conditions, as well as false alarms that can cost alarm monitoring companies, building owners, security professionals and/or police departments significant amounts of money and wasted time that would otherwise be spent on real intrusion situations.

According to an aspect, a method includes sending by a computer to a drone a message to cause the drone to fly to a specific location within a facility, determining when the drone has reached the specific location, causing the drone to enter a hover mode, where the drone remains in a substantially fixed location hovering over the specific location within the facility, receiving sensor data from a sensor carried by the drone, apply processing to the sensor data to detect an unacceptable level of detected feature differences in features contained in the sensor data at the location in the facility; and outputting an indication of unacceptable level of detected feature differences.

The following are some of the features within this aspect.

The method autonomously launches the drone from a drone station on demand by reception of the message to the drone. The method causes the drone to check by to the drone station within the facility when an indication is received to terminate the hover mode. The indication is received from a server or central monitoring station causing the drone to terminate the hover mode. The indication received is a signal that indicates the drone needs refueling. The sensor data is captured by the drone and compare with sensor data previously captured to determine whether there exists the unacceptable level of detected feature differences.

According to an aspect, an unmanned aerial vehicle includes a computer carried by the unmanned aerial vehicle to control flight of the unmanned aerial vehicle, at least one sensor carried by the unmanned aerial vehicle, with the computer configured to cause the unmanned vehicle to fly to a specific location within a facility, determine when the unmanned aerial vehicle has reached the specific location, cause the unmanned aerial vehicle to enter a hover mode, where the unmanned aerial vehicle remains in a substantially fixed location hovering over the specific location within the facility, receive sensor data from the sensor carried by the unmanned aerial vehicle, apply processing to the sensor data to detect an unacceptable level of detected feature differences in features contained in the sensor data at the location in the facility, and output an indication of unacceptable level of detected feature differences to a remote server system.

Aspects of the invention include computer program products tangible stored on a physical, hardware storage device or devices or systems.

The above techniques can include additional features and can provide one or more of the following advantages.

The use of drones and analysis information provided by the drones would likely significantly reduce the rate of false alarms while providing more robust surveillance monitoring at lower costs than many current techniques. Reducing false alarms would likely minimize costs borne by alarm monitoring companies, building owners, and security professionals, and better utilize police department resources to handle real intrusion situations.

The details of one or more embodiments of the invention are set forth in the accompanying drawings and the description below. Other features, objects, and advantages of the invention is apparent from the description and drawings, and from the claims.

DETAILED DESCRIPTION

Figure 1:
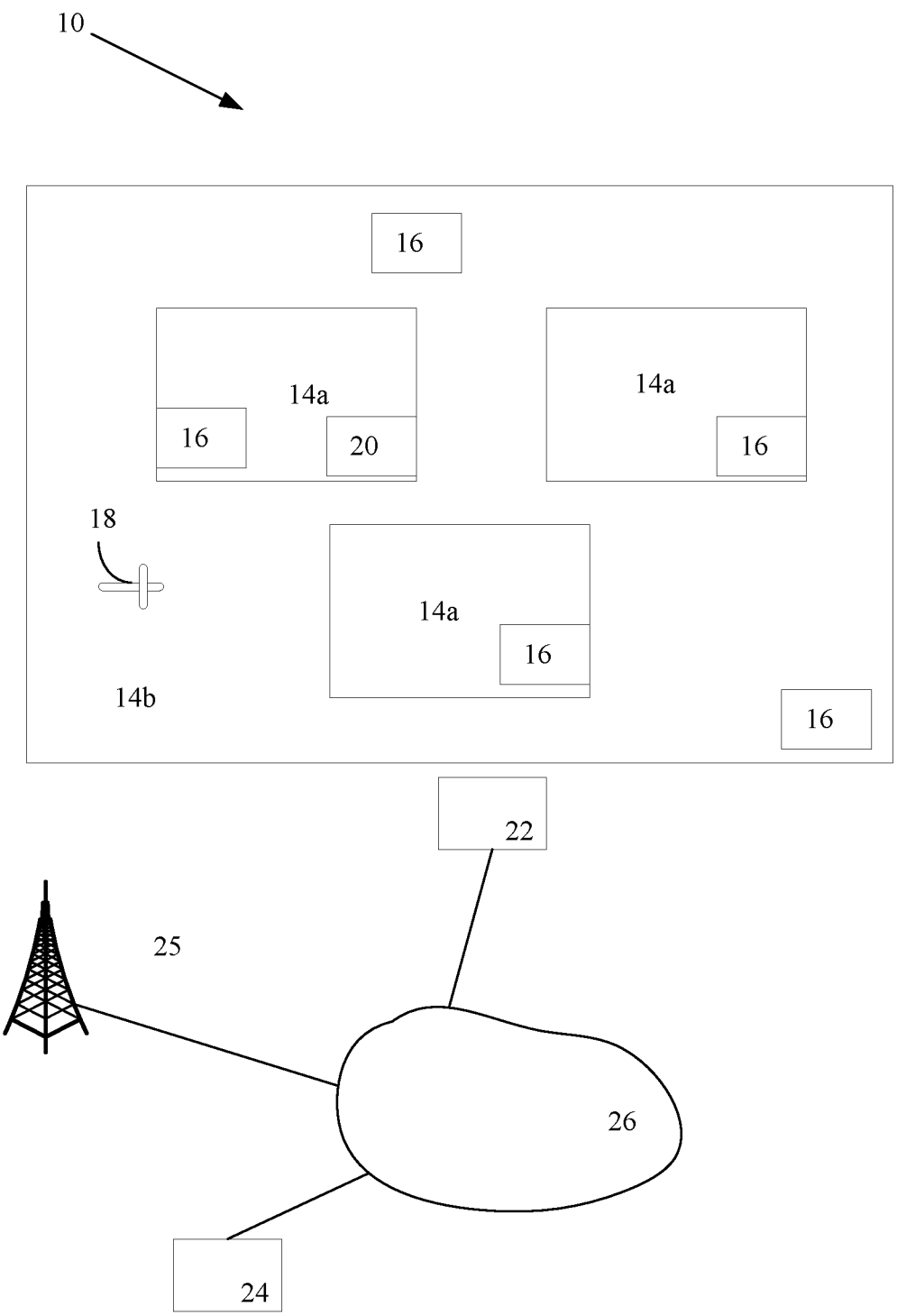
FIG. 1 is a schematic diagram of an example surveillance system at a facility, according to some embodiments.

Referring now to FIG. 1, an example application 10 of a surveillance system 12 installed at a facility 14 is shown. In this example, the facility 14 is, e.g., a commercial, industrial, facility, with interior areas, 14a (buildings) and exterior areas 14b that are subject to surveillance. The buildings 14a can be of any configuration, wide open spaces such as a warehouse, to compartmentalized facilities such as labs/offices. The surveillance system 12 includes one or more UAV or drone stations 16 (for example, HATP's, discussed below). A UAV (unmanned aerial vehicle) commonly known as a drone is a remotely piloted airborne vehicle, i.e., an aircraft that does not have a human pilot aboard. However, a human controls the flight of the drone remotely or in some applications the flight of the drone is controlled autonomously by onboard computers.

The drone stations 16 provide bases for one or more of the plural drones 18. The system also includes a server 20 that is in communication with the drones 18 and a gateway 22 to send data to and receive data from a remote, central monitoring station 24 (also referred to as central monitoring center) via one or more data or communication networks 26 (only one shown), such as the Internet; the phone system or cellular communication system 25 being examples of others. The server 20 receives signals from the plural drones. These signals include video signals from onboard cameras as well as location information.

Figure 1A:
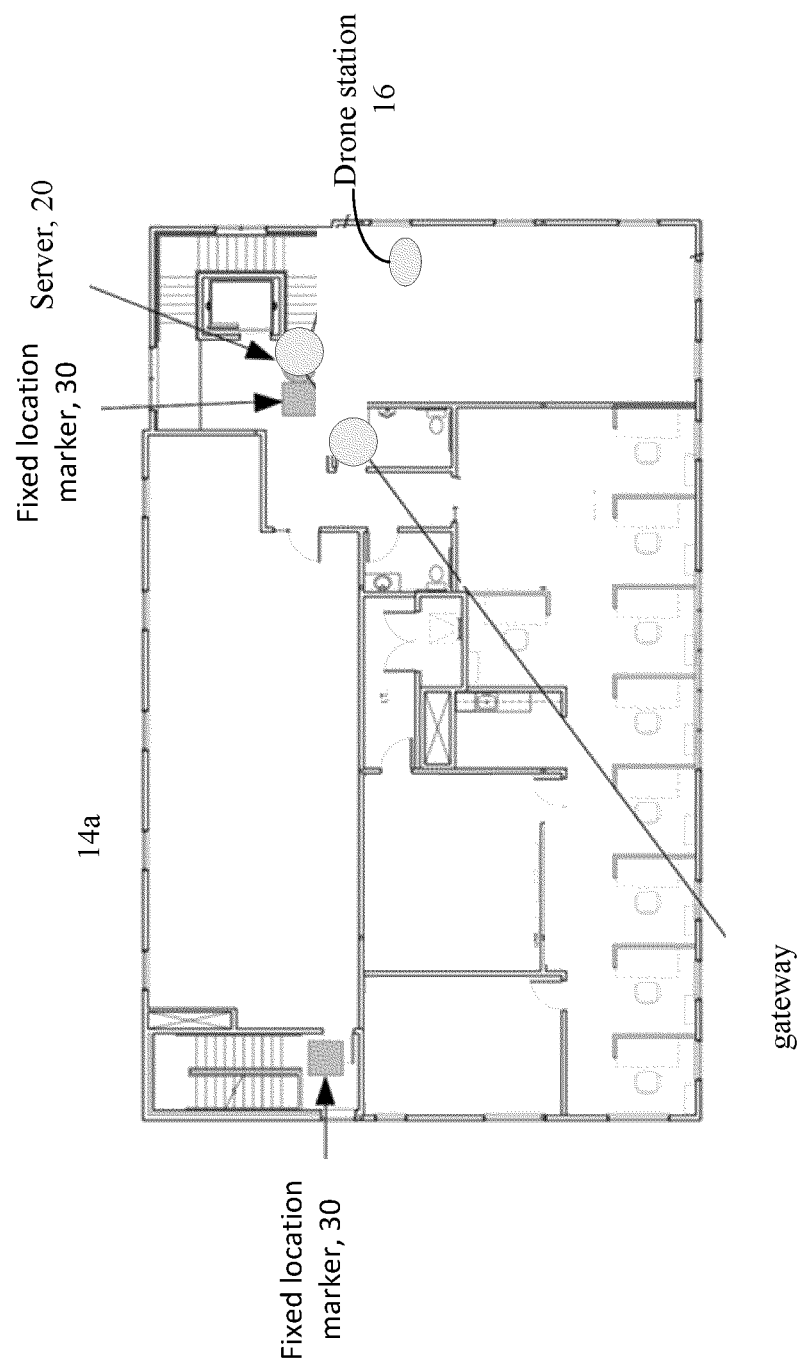
FIG. 1A is a schematic of a typical structure, according to some embodiments.

Referring to FIG. 1A an exemplary floor plan for an exemplary one of the buildings 14a is shown in some detail, including hallways, and offices with various doorways, all shown schematically but not with reference numbers. Also shown are fixed location markers 30 that can be any one of a number of technologies, e.g., waypoints discussed below, the server 20, gateway 22 and drone station 16 that is likewise a waypoint discussed below.

The drones can carry several types of sensor/detectors. One type of sensor is a video camera that sends video data to the server 20. Examples of other types of sensors 28b include microphones to send audio data. The sensors 28 communicate wirelessly to the server 20 or communicate through an on-board computer on the drone. In general, sensors 28a capture audio and video and send signals to the server 20. Based on the information received from the sensors 28a, the server 20 determines whether to trigger and/or send alarm messages to the monitoring station 18. An operator at the remote control station controls actions of the drone.

The data or communication network 24 may include any combination of wired and wireless links capable of carrying packet and/or switched traffic, and may span multiple carriers, and a wide geography. In one embodiment, the data network 24 may simply be the public Internet. In another embodiment, the data network 24 may include one or more wireless links, and may include a wireless data network, e.g., with tower 25 such as a 2G, 3G, 4G or LTE cellular data network. Further network components, such as access points, routers, switches, DSL modems, and the like possibly interconnecting the server 20 with the data network 24 are not illustrated.

Figure 2:
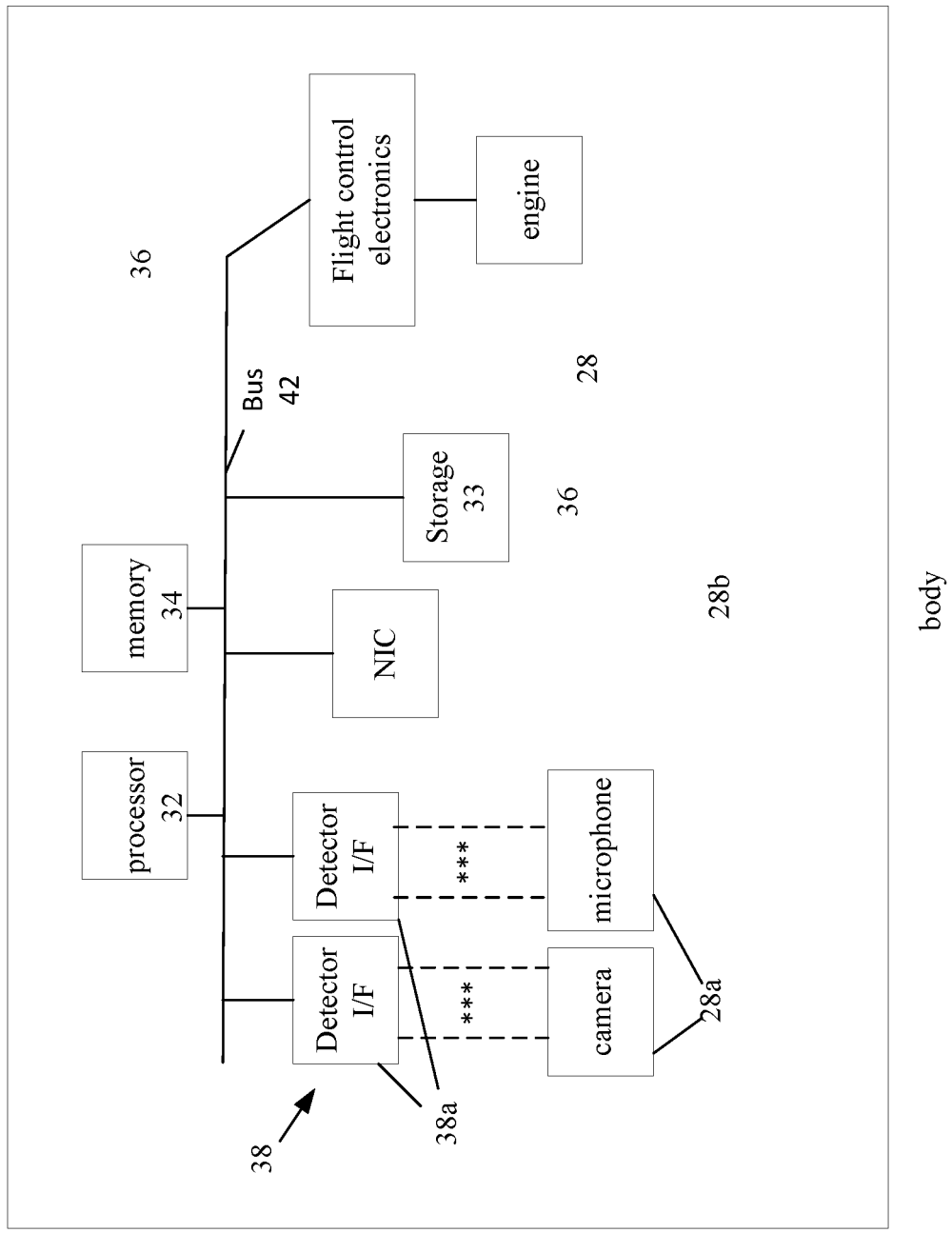
FIG. 2 is a block diagram of a surveillance system, according to some embodiments.

Referring now to FIG. 2, details on an exemplary drone 18 are shown. The drone 18 includes processor 32 and memory 34, and storage 33 and a wireless network interface card (NIC) 36 all coupled via a bus 42. The drone 18 also includes one or more sensors and one or more interfaces 38 to receive sensor data from the sensors 28. Illustrated for explanatory purpose are camera and microphone sensors 28 and interfaces 38 for those sensors. The sensors 28 are coupled to the interfaces either via hard wiring or wirelessly. The drone 18 also includes flight control electronics and one or more electric motors to control one or more propellers. The drone includes a body that can be either that of a plane or a helicopter. The drone flight control electronics are responsive to control signals received by the processor via the wireless interface card that allow a remotely positioned operator to control flight of the drone and control the camera and microphone on the drone.

Figure 3:
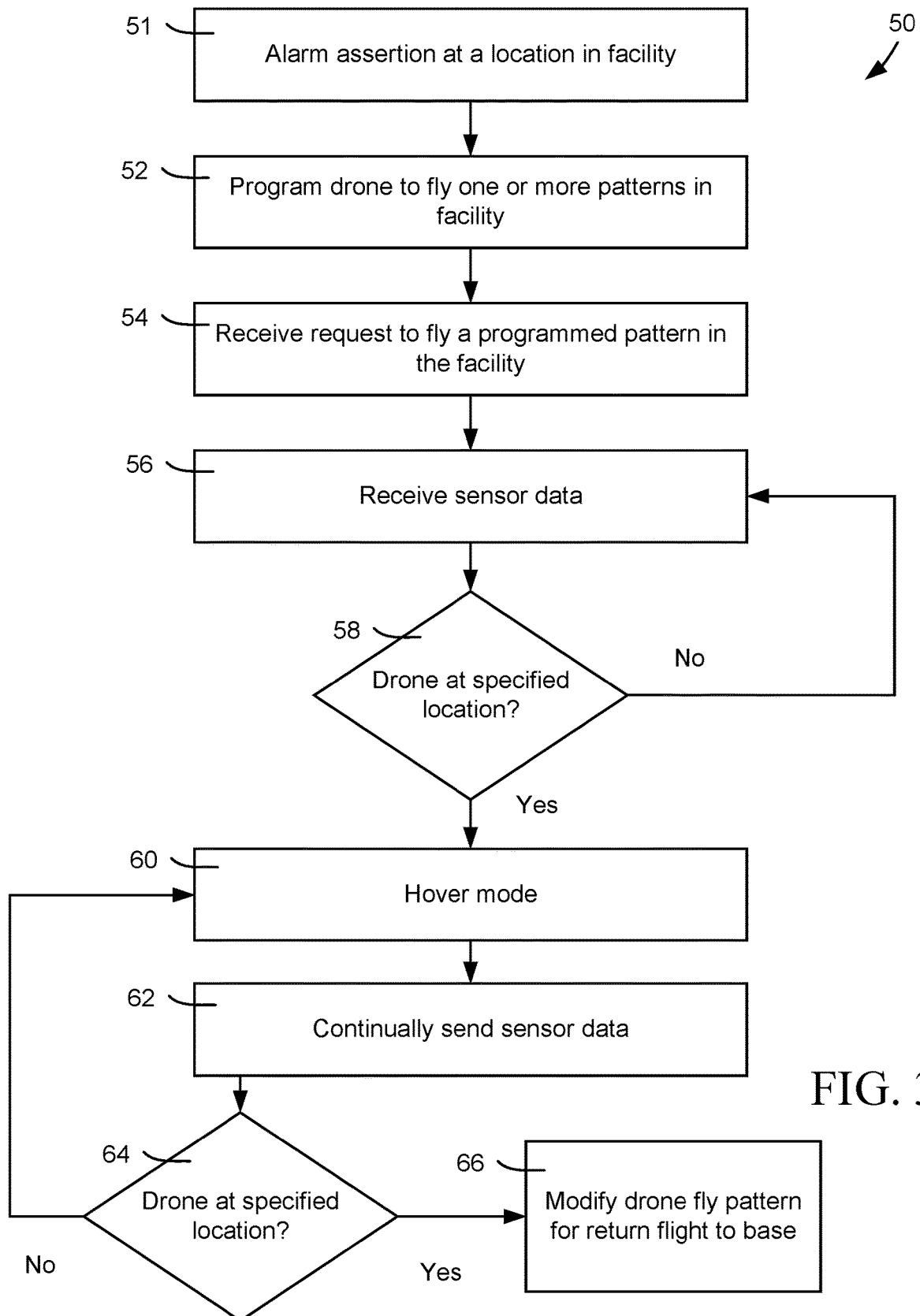
FIG. 3 is a flow diagram showing an example process for determining surveillance mapping, according to some embodiments.

Referring now to FIG. 3, an alarm condition is asserted 51 within the facility. In response to the alarm condition, the drone is autonomously programmed 52 by the server with a route that starts from the drone's initial location, typically a home station to a location where the alarm condition was asserted. The drone in an autonomous manner flies to that location in the building carrying sensors to gather sensor data that can be in various forms such as live video that is sent back to the server and onto the security monitoring center where the video is stored and viewed.

The drone is launched, and as the drone flies the programmed pattern it collects such sensor data. However, the drone is programmed to fly to a particular location within a facility. The drone or the server determines 58 when the drone is at the specified location. Prior to arriving, (determination is "no") the drone continues to send and the server receives sensor data over the flight path. Once the drone arrives at that specific location in the facility, the drone hovers 60 at that location in the facility by entering a hover mode. The drone can be controlled autonomously such that the camera is pointing to a location of interest or at that point the drone can be controlled by an operator. The drone continually captures 62 sensor data, e.g., video. This data is stored and sent back to the operator for display on a display device. At some point the drone receives 64 a signal to return to base. The signal can originate either from the operator (monitoring station) or the server 20, an authorized client device (not shown) or the drone 18 itself, as the drone would be monitoring its fuel supply or level of remaining battery charge. In the latter situations of the signal originating from the server 20 or authorized client device or the drone 18 itself, one of those devices would send a signal back to the operator (monitoring station) to indicate that the drone 18 is returning to base 66 to allow another drone to be launched. Guidance within or outside of a building can be accomplished by several techniques.

For example, when outside of a building, guidance can be accomplished by global position system (GPS) tracking. Alternative techniques include an operator at the monitoring facility manually flying the drone to a specific location or having the drone hover at the location. Within a building guidance can be accomplished by feature recognition to follow a preprogrammed map of the interior of the building. Another type of navigation is a map based type navigation that includes a database that stores images of landmarks, descriptions of items and navigation instructions. A third type of navigation is by r.f. (radio frequency) beacons being deployed within the facility, sending out r.f signals that a guidance system on board the drone captures and uses to apply a triangulation algorithm to figure out current location.

Within a building feature several guidance techniques whether r.f.-based, sonar-based or optical-based, can be used.

Crash Avoidance:

The drone has crash avoidance systems that are used during flight to detect and record any physical objects that disrupt the ability of the drone to follow a route plan. Many drones now come supplied with crash avoidance systems that determine proximity to nearby objects and are used with drone navigation to navigate around the object and return to a preprogramed path or route.

When establishing a route plan (RP), programmable waypoints placed, e.g., at location points, objects, locations, etc. along a path determined by the plan that a drone will fly to in sequential order while using crash avoidance capability to move along safely and intact between waypoints. The number of programmable routes is limited by the amount of onboard memory allocated for routes. If RPs are stored on a server and delivered to the drone during flight, the number of waypoints is limited by the amount of server memory and processing power allocated for waypoints. The waypoints are small devices that are programmable and include an RF transmitter devices, e.g., RFID or low power RF transmitters that continually broadcast its identity and/or placement and which are placed at locations where the asset being protected is located and at all permitted points of entry to the protected area.

One type of waypoint is an Asset to Protect (ATP) waypoint. These waypoints are a specific type of waypoint that is placed near the item or area of high value and susceptible to attack or theft. Another type of waypoint is Home Asset to Protect (HATP) waypoint. This is a specific type of waypoint. This waypoint itself is a high value item, and susceptible to attack or theft. It is the home for the drone where the drone docks, recharges, and exchanges data with the server(s) the drone is associated with. The drone continually calculates how much power the drone has for flying, how far away the drone is from a HATP, and thus can calculate when to return to an HATP for recharging. Another type of waypoint is a Perimeter Point to Protect (PPP) waypoint. This is a specific type of waypoint that are placed along perimeters along a route. This waypoint is an item or area of high value and susceptible to attack or theft.

The Route Plan (RP) is a flight path that is developed and programmed into the drone, by the server executing a flight service. The Route Plan is established by the use of the aforementioned waypoints. The Route Plan can be predefined for each HATP waypoint to each location of interest, i.e., ATP waypoint. These RP can be preloaded into the drone, memory permitting, or a single RP can be uploaded into the drone on demand, based on a detected alarm condition by the server. During flight, the drone recognizes the existence of the waypoints and uses the waypoints to navigate to and between waypoints. Using crash avoidance while traveling to a waypoint, the flight plan is established and recorded. When flying the route, the drone uses crash avoidance to determine and report any deviations from the already determine plan. The drone captures images of the deviation and reports them as troubles during the premises disarmed period or alarm during the premises armed period.

A Triggered Alarm Response (TAR) is provided by the drone and server that contain the flight service programmed with the awareness of the desired (normal non-alarm/trouble) condition of the environment is interfaced to other security systems and/or services, i.e. Intrusion Detection System, Access Control, and Video Surveillance. The interface can be done through a predefined Application Programming Interface (API) using Web Services, XML, or proprietary formats. Through this interface and by input of the operator/user via a graphical user interface, the Route Plan relative to the location of the waypoints knows the location of the points of protection from the other connected alarm systems. On any alarm or trouble that is initiated by an interconnected security system, the drone uses the RP and crash avoidance to fly to the waypoint closest to the reported point of protection that triggered the alarm or trouble to capture and transmit to the Home Asset to Protect (HATP) point(s) video images, sound, and temperature. This data is fed to a RP service analytics engine for comparison to the normal non-alarm/trouble condition, and relayed to the command center and/or monitoring center.

More specifically, the drone navigates by the above mentioned waypoints processing captured signals from the various waypoints to recognize its current position (e.g. stairs, exits, doors, corridors, etc.) within a facility. The drone has stored the flight plan that takes into consideration the relevant building or environment. Having this information, the drone correlates captured signals to features in the flight plan. By correlating the captured signals to the features in the flight plan, the drone can determine its current waypoint, is provided information on that waypoint, and can navigate to a subsequent waypoint based on the flight plan. The drone may incorporate the functionality of a compass to assist in navigation. In some implementations, the processing, rather than being performed by the drone, is performed by the server and the server receives the signals, processes the signals against the flight plan and the server sends navigation instructions to the drone to control flight of the drone.

A flight plan is essentially a navigation map structure that is produced and includes paths between a starting waypoint and an ending waypoint. The navigation map is stored as a structure such as a graph data structure that includes a set of nodes and a set of edges that establish relationships (connections) between the nodes. A graph g is defined as follows: g=(V, E), where V is a finite, non-empty set of vertices and E is a set of edges (links between pairs of vertices). When the edges in a graph have no direction, the graph is called undirected, otherwise it is called directed. Information may be associated with each node and edge of the graph. Each location or landmark corresponds to a waypoint and is represented as a node or vertex of the graph, and each description or distance between two waypoints is represented as an edge or link between the nodes. Associated with each edge is information that is in the form of flight instructions that control how the drone navigates from one node to the next node, e.g., by including data on engine speed and direction.

The edges correspond to relationships between the waypoints. Each edge has information about connectedness to other waypoints and information about proximity of waypoints. Since each node generally has one or more edges that connect to one or more nodes, a description of the relationship between nodes, such as navigation instructions for the flight electronics are obtained by accessing the data structure that stores the information defining the relationships among the waypoints.

Figure 4:
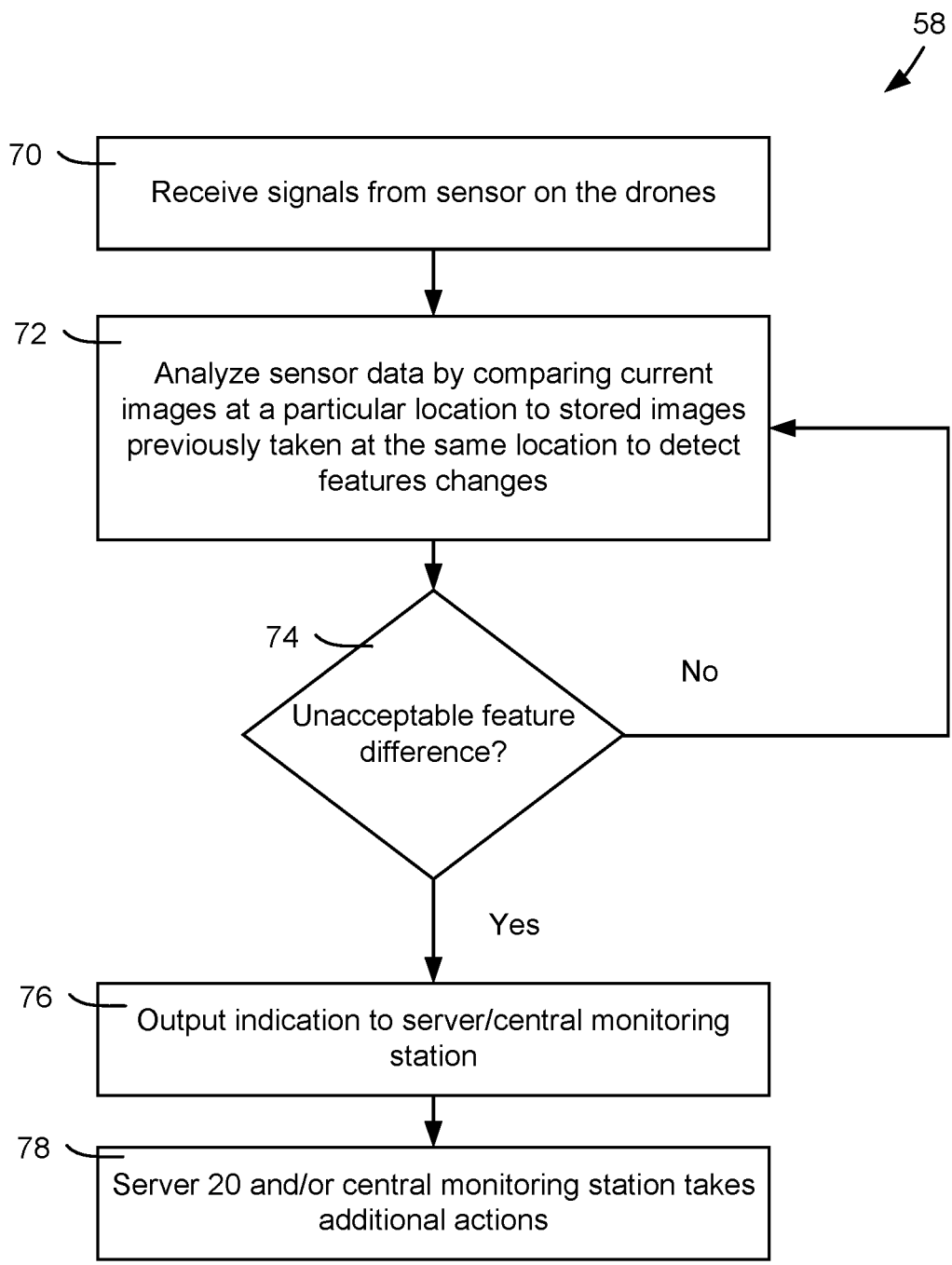
FIG. 4 is a flow diagram of an analysis process, according to some embodiments.

Referring now to FIG. 4, the server 20 system and/or the central monitoring station receives 70 signals from various sensors e.g., a camera, a microphone, etc. on the drones. The server 20 applies 72 analytics to the sensor data, e.g., the video, by comparing for instance, current images captured by the drone at a particular location to stored images previously taken at the same location to detect features in the current images that are different than expected based on the stored images.

In the case where an unacceptable level of feature differences is detected 74 that could be an indication of detected movement of a person or thing, within the field of view of the images, the analytics outputs an indication. In the case where the server performs the processing, the server 20 notifies the monitoring station or where the monitor station 20 is performing the processing, monitoring station alerts the operator. Additional actions 78 can be taken by the server 20 and/or central monitor station 24, as a result of outputting the indication. For example, the processing upon detection of an unacceptable level of feature differences can signal launching of additional drones or for an intervention or modification of the hover position of the drone.

When the drone is in the autonomous mode, a modified flight pattern can be accomplished by the server 20 producing a new flight pattern taking into consideration results of analytics processing, and reprogramming the drone with the new flight pattern. Alternatively, the server 20 can cause flight control of the drone to be transferred to an operator. The analytics processing produces messages that are sent to a display (not shown) within view of the operator to assist the operator in guiding the drone and thus apply a new flight pattern. The new flight pattern can be varied including causing the drone to hover about that location providing continuous video surveillance back to the monitoring station or to follow a path determined by the analytics processing.

The alarm condition discussed above can be detected by other sensors within a facility, such as a window being opened or a glass break detector or contact switch being asserted which are captured by an intrusion detection system (not shown). A drone at a Home Asset to Protect (HATP) waypoint is autonomously launched from the Home Asset to Protect (HATP) waypoint, by the server 20 that is also part of broader intrusion detection system (not shown) to fly to that location providing constant surveillance of the location until the incident is evaluated and handled.

The drone, the server or the central monitor station can perform, part or all of the processing in FIGS. 3 and 4.

The system includes a charging station HATP waypoint where drones land to recharge batteries (not shown) as needed. The drones are small, inexpensive devices that are programmed to fly a predetermined pattern or to specific locations of interest within a building providing live video back to a security monitoring center.

Drone Characteristics:

Drones employed herein are selected according to the type and nature of the surveillance. For example, when the drones are employed to hover, a helicopter type drone might be preferable to an airplane type drone. In addition, when deployed outdoors of the facility, the drones in general can be relatively large in comparison to those employed inside a building within the facility. Moreover, a drone employed within a building that has wide open spaces can be in general larger than one employed in a building that has many rooms and corridors. Thus, a typical wing span for a drone outside can be 1 to 5 feet, whereas inside it would likely be less than 1 foot. In addition, when used exclusively outside the drone can be powered by a hydrocarbon, e.g., gas or gasoline engine, whereas inside the drone should be powered electrically, e.g., fuel cell and/or batteries. These are however general considerations and specific applications would govern actual implementations.

Various sensors can be carried by the drone, thus sensors include microphones to sense sound, and cameras to capture images and/or video. However, other sensors can include sensors to capture motion, vibration, pressure, heat, and so forth, in an appropriate combination to detect a true condition in a facility.

The memory 34 stores program instructions and data used by the processor. The memory 34 may be a suitable combination of random access memory and read-only memory, and may host suitable program instructions (e.g. firmware or operating software), and configuration and operating data and may be organized as a file system or otherwise. The program instructions stored in the memory may further store software components allowing network communications and establishment of connections to the data network.

Program instructions stored in the memory along with configuration data may control overall operation of drone.

An example monitoring station 18 can be a single physical monitoring station or center in FIG. 1. However, it could alternatively be formed of multiple monitoring centers/stations, each at a different physical location, and each in communication with the data network 24. The central monitoring station 18 includes one or more monitoring server(s) 82 each processing messages from the drones and/or user devices (not shown).

The monitoring server 82 may include a processor, a network interface and a memory (all not illustrated). The monitoring server 82 may physically take the form of a rack mounted card and may be in communication with one or more operator terminals (not shown). An example monitoring server 82 is a SURGARD™ SG-System III Virtual, or similar system.

The processor of each monitoring server 82 acts as a controller for each monitoring server 82, and is in communication with, and controls overall operation, of each server 82. The processor may include, or be in communication with the memory that stores processor executable instructions controlling the overall operation of the monitoring server 82. Suitable software enable each monitoring server 82 to receive alarms and cause appropriate actions to occur. Software may include a suitable Internet protocol (IP) stack and applications/clients.

Each monitoring server 82 of central monitoring station 18 may be associated with an IP address and port(s) by which it communicates with the control panels 16 and/or the user devices to handle alarm events, etc. The monitoring server address may be static, and thus always identify a particular one of monitoring server 32 to the intrusion detection panels. Alternatively, dynamic addresses could be used, and associated with static domain names, resolved through a domain name service. The network interface may be a conventional network interface that interfaces with the network 24 (FIG. 1) to receive incoming signals, and may for example take the form of an Ethernet network interface card (NIC).

Servers can be any of a variety of computing devices capable of receiving information, such as a server, a distributed computing system 10, a rack-mounted server and so forth. Server may be a single server or a group of servers that are at a same location or at different locations. Servers can receive information from client device user device via interfaces. Interfaces can be any type of interface capable of receiving information over a network, such as an Ethernet interface, a wireless networking interface, a fiber-optic networking interface, a modem, and so forth. Server also includes a processor and memory and a bus system including, for example, an information bus and a motherboard, can be used to establish and to control information communication between the components of server.

Processor may include one or more microprocessors. Generally, processor may include any appropriate processor and/or logic that is capable of receiving and storing information, and of communicating over a network (not shown). Memory can include a hard drive and a random access memory storage device, such as a dynamic random access memory computer readable hardware storage devices and media and other types of non-transitory storage devices.

Embodiments can be implemented in digital electronic circuitry, or in computer hardware, firmware, software, or in combinations thereof. Computer programs can be implemented in a high-level procedural or object oriented programming language, or in assembly or machine language if desired; and in any case, the language can be a compiled or interpreted language. Suitable processors include, by way of example, both general and special purpose microprocessors. Generally, a processor will receive instructions and information from a read-only memory and/or a random access memory. Generally, a computer will include one or more mass storage devices for storing information files; such devices include magnetic disks, such as internal hard disks and removable disks; magneto-optical disks; and optical disks. Hardware storage devices suitable for tangibly embodying computer program instructions and information include all forms of non-volatile memory, including by way of example semiconductor memory devices, such as EPROM, EEPROM, and flash memory devices; magnetic disks such as internal hard disks and removable disks; magneto-optical disks; and CD_ROM disks. Any of the foregoing can be supplemented by, or incorporated in, ASICs (application-specific integrated circuits).

Other embodiments are within the scope and spirit of the description claims. For example, due to the nature of software, functions described above can be implemented using software, hardware, firmware, hardwiring, or combinations of any of these. Another type of crash avoidance systems e.g., navigation is recognition-based guidance accomplished by applying feature recognition to follow a preprogrammed map of the interior of the building. The map would be as a series of features extracted from images. The drone capture images during flight, applies feature recognition to the images and extracts those recognized features and compares recognized features to features in the map to adjust flight paths, as needed within the building. Other embodiments are within the scope of the following claims.

What is claimed is:

1. A method of aerial surveillance, comprising:
   receiving, by a computer system from a server of a building, an alarm condition;
   programming, by the computer system and responsive to the alarm condition, an electronic component of a drone with a route between a starting point and a location associated with the alarm condition, the route indicated by a data structure representation of a plurality of radio-frequency (RF) devices;
   the drone configured to navigate to the location associated with the alarm condition based on determinations of drone position on the route using signals from the plurality of RF devices; and
   sending, by the drone, to the computer system, sensor data associated with the location associated with the alarm condition.

2. The method of claim 1, comprising:
   providing a flight plan to cause the drone to hover.

3. The method of claim 1, comprising:
   receiving the alarm condition from a sensor of a facility.

4. The method of claim 1, comprising:
   the alarm condition indicating an open window, broken glass, or an intrusion.

5. The method of claim 1, comprising:
   identifying, by the computer system, an indication of a detected movement at the location associated with the alarm condition.

6. The method of claim 1, wherein the drone is a first drone, comprising:
   programming a second drone with the route between the starting point and the location associated with the alarm condition.

7. The method of claim 1, comprising:
   providing, to the drone, a command to return to the starting point.

8. The method of claim 1, comprising:
   the data structure representation comprising a series of features extracted from images; and
   the drone adjusting the route based on applying feature recognition to the series of features, feature recognition comprising:
   capturing flight images;
   extracting recognized features from the flight images; and
   comparing the recognized features to the series of features.

9. The method of claim 1, comprising:
   the data structure representation including a feature extracted from an image; and
   adjusting the route based on applying feature recognition to the feature, the feature recognition including:
   obtaining a flight image;
   extracting a flight image feature from the flight image; and
   comparing the flight image feature with the feature extracted from the image.

10. The method of claim 1, comprising:
    determining a deviation from the route based on a location of the drone; and
    obtaining, by the computer system, an indication of the deviation.

11. The method of claim 1, comprising:
    at least one of the plurality of radio-frequency (RF) devices including an asset-to-protect (ATP) waypoint, a home-asset-to-protect (HATP), or a perimeter-point-to-protect (PPP) waypoint.

12. An aerial surveillance system, comprising:
    a plurality of radio-frequency (RF) devices;
    a computer system to:
    generate an indication of a route between a starting point and a location of interest, the indication of the route comprising a data structure representation of the plurality of RF devices; and
    a drone to:
    receive at least a portion of the indication of the route from the computer system;
    navigate to the location of interest based on signals from the plurality of RF devices; and
    send to the computer system sensor data of the location of interest.

13. The system of claim 12, comprising:
    the data structure representation including a feature extracted from an image; and
    the drone to adjust the route based on feature recognition of the feature.

14. The system of claim 12, comprising:
the drone to determine a deviation from the route, and to report the deviation from the route to the computer system.

15. The system of claim 12, comprising:
the computer system to update the route based on a deviation.

16. The system of claim 12, comprising:
the computer system to compare the sensor data to previous sensor data; and
send an indication to a server of a building in response to determination of a feature difference based on the comparison.

17. The system of claim 12, comprising:
the plurality of radio-frequency (RF) devices including an asset-to-protect (ATP) waypoint, a home-asset-to-protect (HATP) waypoint, or a perimeter-point-to-protect (PPP) waypoint.

18. The system of claim 12, comprising:
the data structure representation comprising a set of nodes and a set of edges, each of the set of nodes corresponding to one of the plurality of RF devices and the set of edges defining a relationship between the set of nodes.

19. A navigation system for an indoor aerial surveillance system comprising:
a plurality of radio-frequency (RF) devices; and
a computer system to:
generate a data structure representation of a path between a starting point and a location of interest, the data structure representation comprising the plurality of RF devices and one or more routes between each of the plurality of RF devices;
update the data structure representation based on data received from one or more drones;
send a route of the one or more routes to a drone of the one or more drones; and
the drone configured to navigate to a RF device of the plurality of RF devices based on the route and a position based on a signal from at least one of the plurality of RF devices.

20. The system of claim 19, comprising:
each of the plurality of radio-frequency (RF) devices including an asset-to-protect (ATP) waypoint, a home-asset-to-protect (HATP) waypoint, or a perimeter-point-to-protect (PPP).

* * * * *